United States Patent
Clark et al.

(10) Patent No.: US 8,131,930 B1
(45) Date of Patent: Mar. 6, 2012

(54) SYSTEM AND METHOD FOR IMPROVING CACHE EFFICIENCY

(75) Inventors: Roy Clark, Hopkinton, MA (US); David W. DesRoches, Methuen, MA (US); Kiran Madnani, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 790 days.

(21) Appl. No.: 12/059,330

(22) Filed: Mar. 31, 2008

(51) Int. Cl.
*G06F 13/00* (2006.01)
*G06F 13/28* (2006.01)

(52) U.S. Cl. ........................ 711/118; 707/747
(58) Field of Classification Search .............. 711/118; 707/747
See application file for complete search history.

(56) References Cited

U.S. PATENT DOCUMENTS

| | | | |
|---|---|---|---|
| 7,673,099 B1 * | 3/2010 | Beaverson et al. | 711/118 |
| 7,865,761 B1 * | 1/2011 | Chilton | 714/2 |

OTHER PUBLICATIONS

Tokar, Les, An Introduction Guide to SSD Storage, Oct 14. 2007, http://www.notebookreview.com/default.asp?newsID=4015.*
Pariseau, Beth, "EMC adds solid-state drives to Symmetrix disk array", Jan. 14, 2008.*
"EMC Innovation Timeline", http://www.emc.com/leadership/timeline/index.htm.*

* cited by examiner

*Primary Examiner* — Edward Dudek, Jr.
(74) *Attorney, Agent, or Firm* — Holland & Knight LLP; Brian J Colandreo, Esq.; Mark H Whittenberger, Esq.

(57) ABSTRACT

A method and computer program product for receiving a newly-received data portion for storing within a cache memory system. A determination is made concerning whether the newly-received data portion corresponds with at least one data portion previously written to and currently resident on the cache memory system. If the newly-received data portion does not correspond with at least one previously-written and currently resident data portion, the newly-received data portion is written to the cache memory system.

20 Claims, 4 Drawing Sheets

SYSTEM AND METHOD FOR IMPROVING CACHE EFFICIENCY

TECHNICAL FIELD

This disclosure relates to single-instance storage systems and, more particularly, to single-instance storage flash-based cache memory systems.

BACKGROUND

Storing and safeguarding electronic data is of paramount importance in modern business. Accordingly, various systems may be employed to protect such electronic data.

For example, storage networks may be employed that contain multiple storage devices. Storage networks may provide some level of redundancy by use of mirrored or redundant components (e.g., disk drives, disk controllers, power supplies and/or fans), each of which may be hot-swappable to avoid downtime.

Storage networks may fall into a plurality of categories, such as Network Attached Storage (NAS) and Storage Area Networks (SAN). A NAS system may be a stand-alone, network-accessible, hard disk storage system that may provide file-level access to electronic data. A SAN array may be a dedicated storage system that may connect numerous storage resources to one or many servers. A SAN may provide block-level access to electronic data through one or more SCSI-based protocols (e.g., Fiber Channel and iSCSI).

The use of solid-state storage devices within such storage networks is increasing in popularity. A solid state storage device is a data storage device that uses solid-state memory to store persistent data. A solid-state storage device may emulate (and therefore replace) a conventional hard disk drive. Additionally/alternatively, a solid state storage device may be used within a cache memory system included within the storage network.

With no moving parts, a solid-state disk drive largely eliminates (or greatly reduces) seek time, latency and other electromechanical delays and failures associated with a conventional hard disk drive.

SUMMARY OF DISCLOSURE

In a first implementation, a method includes receiving a newly-received data portion for storing within a cache memory system. A determination is made concerning whether the newly-received data portion corresponds with at least one data portion previously written to and currently resident on the cache memory system. If the newly-received data portion does not correspond with at least one previously-written and currently resident data portion, the newly-received data portion is stored on the cache memory system.

One or more of the following features may be included. A functionality may be maintained that locates each of the previously-written and currently resident data-portions within the cache memory system. The functionality may be a lookup table. The functionality may be updated to locate the newly-received, data-portion within the cache memory system.

If the newly-received data portion corresponds with at least one previously-written and currently resident data portion, the newly-received data portion may be discarded. A functionality may be maintained that locates each of the previously-written and currently resident data-portions within the cache memory system. The functionality may be a lookup table. The functionality may be updated to associate the newly-received, data-portion with the corresponding at least one previously-written and currently resident data portion.

The data portion may be chosen from the group consisting of: a data extent, a data segment, and a data element. Determining if the newly-received data portion corresponds with at least one data portion previously written to and currently resident on the cache memory system may include generating a mathematical hash of the newly-received data portion and each of the previously-written and currently resident data portions. The mathematical hash of the newly-received data portion may be compared with the mathematical hash of each of the previously-written and currently resident data portions.

In another implementation, a computer program product resides on a computer readable medium that has a plurality of instructions stored on it. When executed by a processor, the instructions cause the processor to perform operations including receiving a newly-received data portion for storing within a cache memory system. A determination is made concerning whether the newly-received data portion corresponds with at least one data portion previously written to and currently resident on the cache memory system. If the newly-received data portion does not correspond with at least one previously-written and currently resident data portion, the newly-received data portion is stored on the cache memory system.

One or more of the following features may be included. A functionality may be maintained that locates each of the previously-written and currently resident data-portions within the cache memory system. The functionality may be a lookup table. The functionality may be updated to locate the newly-received, data-portion within the cache memory system.

If the newly-received data portion corresponds with at least one previously-written and currently resident data portion, the newly-received data portion may be discarded. A functionality may be maintained that locates each of the previously-written and currently resident data-portions within the cache memory system. The functionality may be a lookup table. The functionality may be updated to associate the newly-received, data-portion with the corresponding at least one previously-written and currently resident data portion.

The data portion may be chosen from the group consisting of: a data extent, a data segment, and a data element. Determining if the newly-received data portion corresponds with at least one data portion previously written to and currently resident on the cache memory system may include generating a mathematical hash of the newly-received data portion and each of the previously-written and currently resident data portions. The mathematical hash of the newly-received data portion may be compared with the mathematical hash of each of the previously-written and currently resident data portions.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
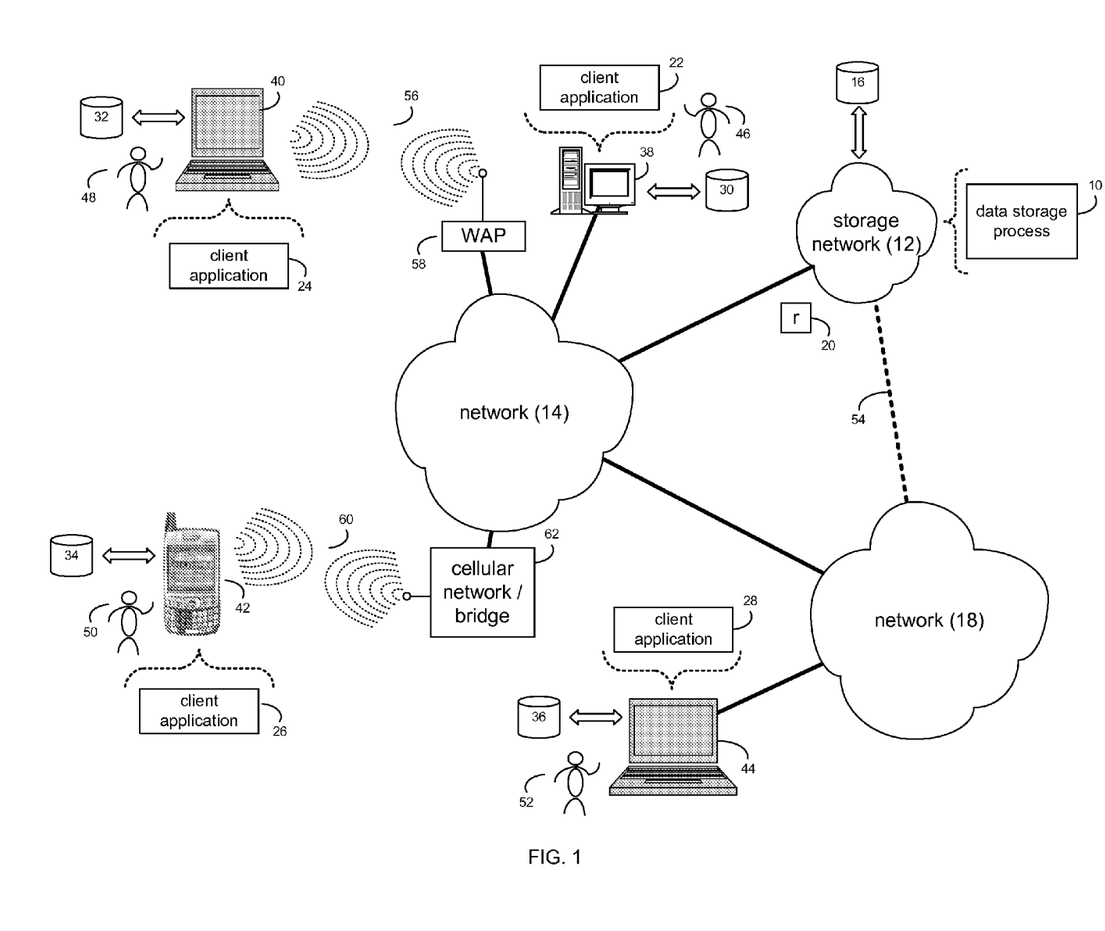
FIG. 1 is a diagrammatic view of a storage network and a data storage process coupled to a distributed computing network.

System Overview:

Referring to FIG. 1, there is shown data storage process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID device and a NAS system. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, data storage process 10 may receive a newly-received data portion for storing within a cache memory system. A determination may be made concerning whether the newly-received data portion corresponds with at least one data portion previously written to and currently resident on the cache memory system. If the newly-received data portion does not correspond with at least one previously-written and currently resident data portion, the newly-received data portion may be written to the cache memory system.

The instruction sets and subroutines of data storage process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID device; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data extent be written to storage network 12) and data read requests (i.e. a request that a data extent be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Data Storage Process:

For the following discussion, client application 22 is going to be described for illustrative purposes. However, this is not intended to be a limitation of this disclosure, as other client applications (e.g., client applications 24, 26, 28) may be equally utilized.

Figure 2:
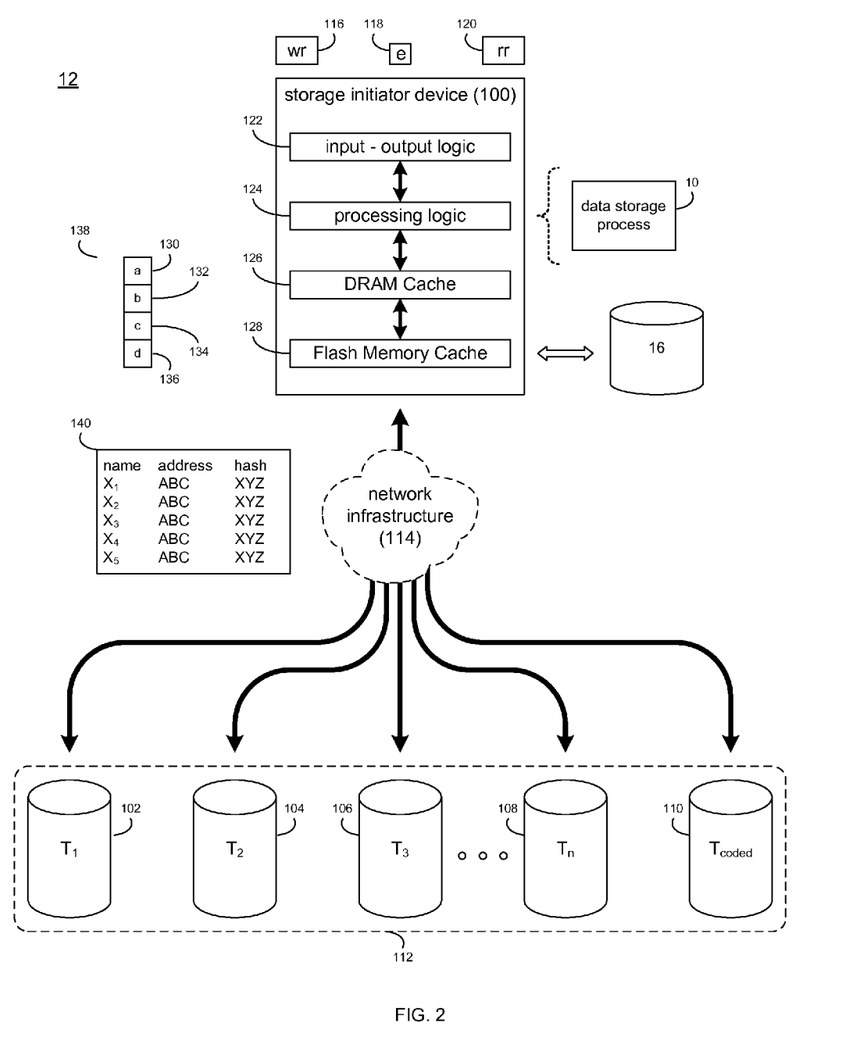
FIG. 2 is a diagrammatic view of the storage network of FIG. 1.

Referring also to FIG. 2, storage network 12 may include a storage initiator device (e.g. storage initiator device 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Additionally/alternatively, one or more of storage targets 102, 104, 106, 108 may be configured as a RAID 1 array, in which data is mirrored between storage targets. By mirroring data between storage targets, a level of high availability is achieved as multiple copies of the data are stored within storage network 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage network 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage network 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage network 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

A combination of storage targets 102, 104, 106, 108 and coded target 110 may form non-volatile, electromechanical memory system 112.

The manner in which storage network 12 is implemented may vary depending upon e.g. the level of redundancy/performance/capacity required. For example, storage network 12 may be a RAID device in which storage initiator device 100 is a RAID controller card and storage targets 102, 104, 106, 108 and/or coded target 110 are individual "hot-swappable" hard disk drives. An example of such a RAID device may include but is not limited to an NAS device. Alternatively, storage network 12 may be configured as a SAN, in which storage initiator device 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage network 12 is configured as a SAN, the various components of storage network 12 (e.g. storage initiator device 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage initiator device 100 may execute all or a portion of data storage process 10. Additionally, one or more of storage targets 102, 104, 106, 108 and/or coded target 110 may execute all or a portion of data storage process 10. For example, data storage process 10 may be a multi-component process that includes e.g., an initiator-based component (not shown) and a target-based component (not shown). For example and for illustrative purposes, the initiator-based component of data storage process 10 may be executed on storage initiator device 100. Further and for illustrative purposes, the target-based component of data storage process 10 may be executed on each of storage targets 102, 104, 106, 108 and/or coded target 110. Accordingly, the initiator-based component of data storage process 10 and the target-based component(s) of data storage process 10 may cooperatively operate to effectuate all of the functionality of data storage process 10.

The instruction sets and subroutines of the initiator-based component of data storage process 10, which may be stored on a storage device (e.g., storage device 16) coupled to storage initiator device 100, may be executed by one or more processors (not shown) and one or more memory architectures (not shown) included within storage initiator device 100. Storage device 16 may include but is not limited to: a hard disk drive; a tape drive; an optical drive; a RAID device; a random access memory (RAM); and a read-only memory (ROM).

The instruction sets and subroutines of the target-based component(s) of data storage process 10, which may be stored on a storage device (not shown) coupled to e.g., each of storage targets 102, 104, 106, 108 and/or coded target 110 may be executed by one or more processors (not shown) and one or more memory architectures (not shown) included within each of storage targets 102, 104, 106, 108 and/or coded target 110. The storage device (not shown) may include but is not limited to: a hard disk drive; a tape drive; an optical drive; a RAID device; a random access memory (RAM); and a read-only memory (ROM).

As discussed above, various data requests (e.g. data request 20) may be sent from client applications 22, 24, 26, 28 to storage network 12, and examples of data request 20 may include but are not limited to data write request 116 (i.e. a request that data extent 118 be written to storage network 12) and data read request 120 (i.e. a request that data extent 118 be read from storage network 12).

As will be discussed below in greater detail, storage initiator device 100 may include input-output logic 122 (e.g., a network interface card), processing logic 124, volatile, solid-state, cache memory system 126 (e.g., a dynamic RAM cache memory system), and non-volatile, solid-state, cache memory system 128 (e.g., a flash-based, cache memory system).

During operation of storage initiator device 100, data (e.g. data extent 118) to be written to storage network 12 may be received by input-output logic 122 (e.g. from network 14 and/or network 18) and processed by processing logic 124. As will be discussed below in greater detail, processing logic 124 may initially store data extent 118 within volatile, solid-state, cache memory system 126, and may subsequently destage data extent 118 to non-volatile, solid-state, cache memory system 128 by gathering a plurality of data extents (e.g., data extent 118) within volatile, solid-state, cache memory system 126, apportioning the data extents into a plurality of data elements (e.g., data elements 130, 132, 134, 136), and destaging this plurality of data elements (e.g., data elements 130, 132, 134, 136) as a single data segment (e.g., data segment 138) to non-volatile, solid-state, cache memory system 128. Processing logic 124 may then destage data segment 138 to the storage targets (e.g. storage targets 102, 104, 106, 108) included within non-volatile, electromechanical memory system 112. Additionally, processing logic 124 may calculate and store coded data on coded target 110 (included within non-volatile, electromechanical memory system 112) that may allow for the regeneration of data lost/corrupted on one or more of storage targets 102, 104, 106, 108.

While not as fast as volatile, solid-state, cache memory system 126, non-volatile, solid-state, cache memory system 128 may be considerably quicker than non-volatile, electromechanical memory system 112. Accordingly, non-volatile, solid-state, cache memory system 128 may be sized so that the number of times that non-volatile, electromechanical memory system 112 is accessed may be reduced. Accordingly, by sizing non-volatile, solid-state, cache memory system 128 so that non-volatile, solid-state, cache memory system 128 retains a quantity of data sufficient to satisfy a significant quantity of data requests (e.g., data request 20), the overall performance of storage network 12 may be enhanced.

Figure 3:
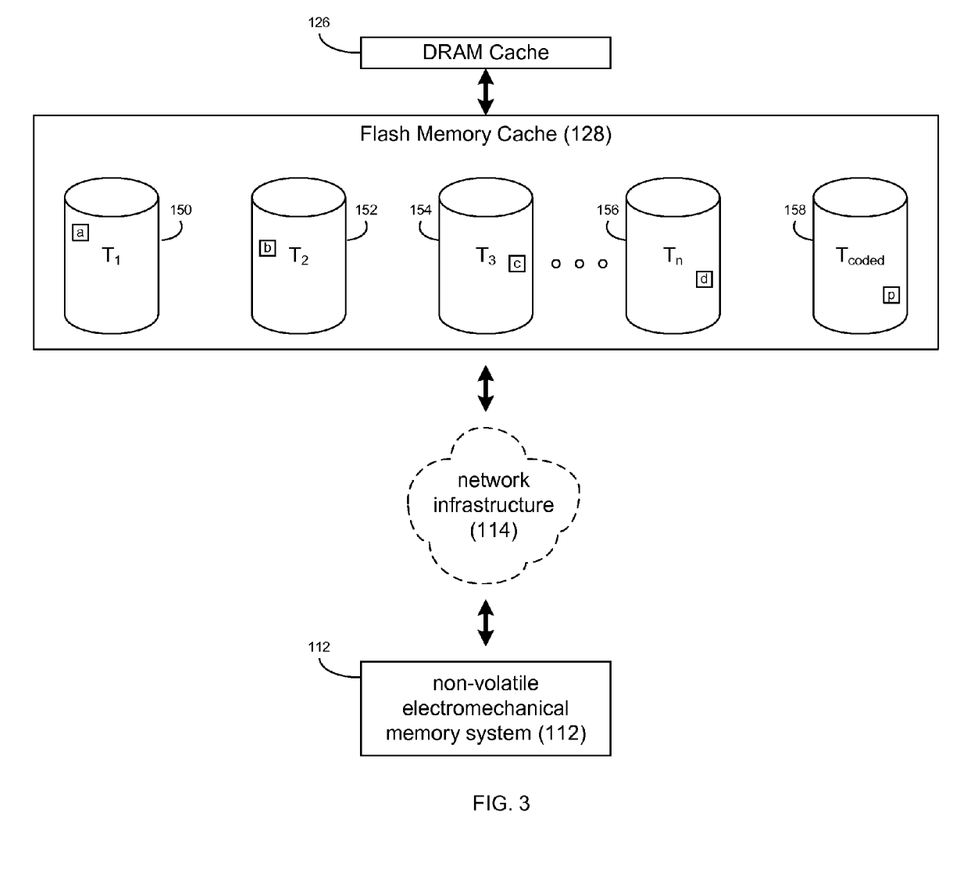
FIG. 3 is a diagrammatic view of a non-volatile, solid-state, cache memory system included within the storage network of FIG. 1.

Referring also to FIG. 3, non-volatile, solid-state, cache memory system 128 may include a plurality of flash solid-state storage devices (e.g. flash solid-state storage devices 150, 152, 154, 156, 158). The plurality of flash solid-state storage devices (e.g. flash solid-state storage devices 150, 152, 154, 156, 158) included within non-volatile, solid-state, cache memory system 128 may be configured as a RAID device that defines coded data.

Accordingly, one or more of the flash solid-state storage devices (e.g. flash solid-state storage devices 150, 152, 154, 156) may be configured as storage targets for storing various data portions received from volatile, solid-state, cache memory system 126 and/or non-volatile, electromechanical memory system 112. Further, one or more of the flash solid-state storage devices (e.g. flash solid-state storage device 158) may be configured as a coded target configured to store coded data that may allow for the regeneration of data portions lost/corrupted on e.g. flash solid-state storage devices 150, 152, 154, 156.

Figure 4:
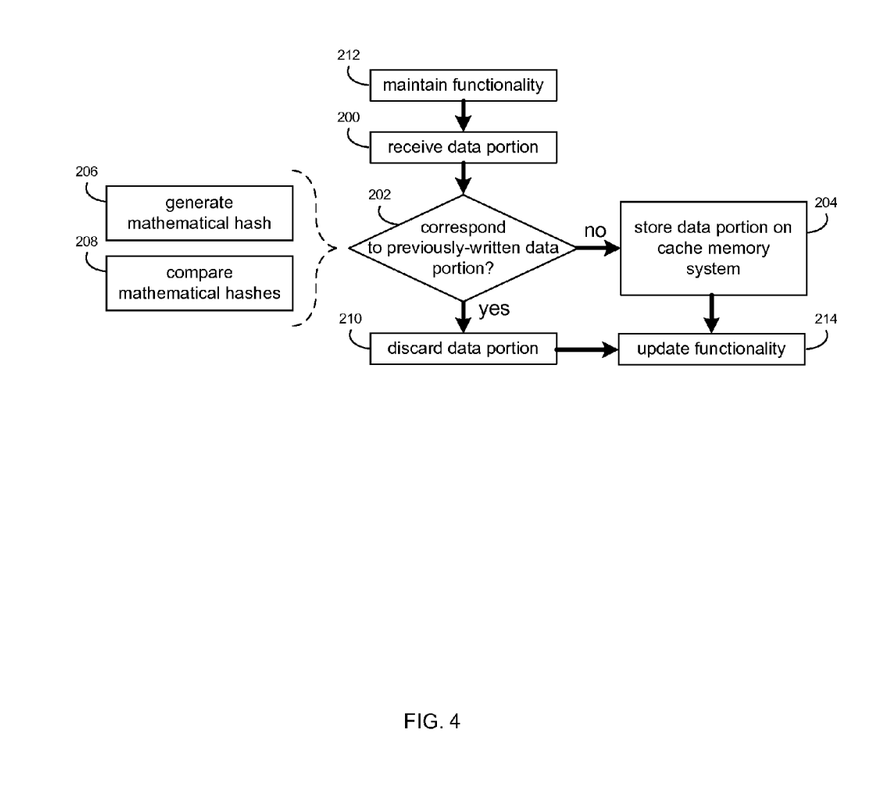
FIG. 4 is a flowchart of the data storage process of FIG. 1.

Referring also to FIG. 4 and for illustrative purposes, assume that data extent 118 is to be written to non-volatile, solid-state, cache memory system 128. Data extent 118 may be received from volatile, solid-state, cache memory system 126 or from non-volatile, electromechanical memory system 112. For example, data extent 118 may be received from network 14 or network 18 for storage upon storage network 12. Upon being received by input-output logic 122, data storage process 10 (which may be executed on processing logic 124) may provide data extent 118 to volatile, solid-state, cache memory system 126. Volatile, solid-state, cache memory system 126 may maintain data extent 118 until data storage process 10 determines that data extent 118 has grown "cold". Data extent 118 may be deemed "cold" when input-output logic 122 has not read data extent 118 from volatile, solid-state, cache memory system 126 for a length of time sufficient to deem the continued storage of data extent 118 within volatile, solid-state, cache memory system 126 unnecessary.

Upon data storage process 10 determining that data extent 118 stored within volatile, solid-state, cache memory system 126 has grown "cold", data storage process 10 may destage data extent 118 to non-volatile, solid-state, cache memory system 128 by gathering a plurality of data extents (e.g., data extent 118) within volatile, solid-state, cache memory system 126, apportioning the data extents into a plurality of data elements (e.g., data elements 130, 132, 134, 136), and destaging this plurality of data elements (e.g., data elements 130, 132, 134, 136) as a single data segment (e.g., data segment 138) to non-volatile, solid-state, cache memory system 128. When destaging data segment 138 to non-volatile, solid-state, cache memory system 128, data storage process 10 may not erase data extent 118 from volatile, solid-state, cache memory system 126 and may merely allow data extent 118 to reside within both volatile, solid-state, cache memory system 126 and non-volatile, solid-state, cache memory system 128 simultaneously.

As is known in the art, when hard disk drives are configured in a RAID5 format, improved reliability may be realized (when compared to non-RAID configurations). However and as is known in the art, performing small random write operations within a RAID5 device is computationally costly and time consuming due to the required pre-read data/parity operations that are needed to compute new parity data for the RAID5 device. Often referred to as a "RAID5 Write Penalty", various companies have developed technology to minimize the impact of the "RAID5 Write Penalty". An example of such technology is disclosed in U.S. Pat. No. 6,865,650 to Morley et al and assigned to EMC Corporation of Hopkinton, Mass.; which is herein incorporated by reference. Such technology may reduce the impact of the "RAID5 Write Penalty" by deploying a "log-based RAID" approach to storing data within a RAID device.

As is known in the art, log-based RAID is the deployment of a Log-structured File System (LFS) onto a conventional RAID architecture, wherein log-style writing allows for the bundling of the data extents (e.g., data extent 118) from multiple small random input/output operations into fewer, larger, data chunks called data elements (e.g., data elements 130, 132, 134, 136) which are destaged as a single data segment (e.g., data segment 138). These data segments may be written to remappable locations on the storage device. By making the size of the data segment align with the stripe size of the RAID5 formatted device, data may be written log-style to the RAID5 device in whole stripes, thus reducing the impact of the above-described "RAID5 Write Penalty".

Data storage process 10 may be configured to utilize such technology. Accordingly, non-volatile, solid-state, cache memory system 128 may be configured as a log-based RAID5 device positioned between volatile, solid-state, cache memory system 126 and non-volatile, electromechanical memory system 112. The above-described log may be stored upon non-volatile, solid-state, cache memory system 128 and written to in whole-stripe-sized segments, and thus volatile, solid-state, cache memory system 126 may not experience the above-described "RAID5 Write Penalty" when volatile, solid-state, cache memory system 126 destages data to non-volatile, solid-state, cache memory system 128 (i.e., when configured as a log-based RAID5 device). Non-volatile, solid-state, cache memory system 128 may then cache data on the premise that a significant ratio of data may be overwritten before needing to be destaged from non-volatile, solid-state, cache memory system 128 to non-volatile, electromechanical memory system 112, thus avoiding costly RAID5 write operations to non-volatile, electromechanical memory system 112.

As a further example, data segment 138 may be provided to non-volatile, solid-state, cache memory system 128 from non-volatile, electromechanical memory system 112 via e.g., network infrastructure 114 for storage within non-volatile, solid-state, cache memory system 128.

For illustrative purposes, assume that data segment 138 is an eight-kilobyte data segment that includes four two-kilobyte data elements, namely data element "a", data element "b", data element "c", and data element "d".

Upon receiving data segment 138 from e.g., volatile, solid-state, cache memory system 126 or non-volatile, electromechanical memory system 112, data storage process 10 may store data segment 138 on non-volatile, solid-state, cache memory system 128.

As discussed above, one or more of the flash solid-state storage devices (e.g. flash solid-state storage devices 150, 152, 154, 156) included within non-volatile, solid-state, cache memory system 128 may be configured as storage targets for storing various data portions received from volatile, solid-state, cache memory system 126 and/or non-volatile, electromechanical memory system 112.

Continuing with the above-stated example in which data segment 138 includes four two-kilobyte data elements, namely data element "a", data element "b", data element "c", and data element "d", when storing data segment 138 within non-volatile, solid-state, cache memory system 128, each data element of data segment 138 may be stored within a unique flash solid-state storage device chosen from the plurality of flash solid-state storage devices (e.g. flash solid-state storage devices 150, 152, 154, 156). For example, data element "a" may be stored within flash solid-state storage device 150; data element "b" may be stored within flash solid-state storage device 152; data element "c" may be stored within flash solid-state storage device 154; and data element "d" may be stored within flash solid-state storage device 156.

As discussed above, one or more of the flash solid-state storage devices (e.g. flash solid-state storage device 158) may be configured as a coded target configured to store coded data that may allow for the regeneration of data portions lost/corrupted on e.g. flash solid-state storage devices 150, 152, 154, 156. As will be discussed below in greater detail, data storage process 10 may generate coded data (e.g., coded element "p") based upon data element "a", data element "b", data element "c", and data element "d" which were stored upon flash solid-state storage devices 150, 152, 154, 156 respectively. The coded data (e.g., coded element "p") generated may be stored upon flash solid-state storage device 158.

As will be discussed below in greater detail, when storing the coded data (e.g. coded element "p"), the coded data may be stored on coded target 158 only a single time for each time a complete data segment (e.g., data segment 138) is stored on flash solid-state storage devices 150, 152, 154, 156 respectively, thus reducing the number of write operations executed upon non-volatile, solid-state, cache memory system 128.

Concerning the coded data (e.g., coded element "p"), when designing a storage network (e.g. storage network 12) to be highly available for data redundancy, high availability may be achieved by either mirroring data, using coded data, or via a combination of both. Data mirroring is essentially maintaining a real-time (or essentially real-time) redundant copy of the data on a separate hard disk drive (or data storage system). Accordingly, when mirroring data that is "striped" across a plurality of hard disk drives (via the use of e.g. a plurality of data elements), the number of hard disk drives required to construct the storage network is the product of the number of "striped" drives and the desired number of data "minors".

By using coded data, the total number of drives required to obtain the desired level of high availability may be reduced. Specifically, a single parity drive may be used to provide high availability for a plurality of storage targets. For example, non-volatile, solid-state, cache memory system 128 is shown to include four flash solid-state storage devices, namely flash solid-state storage device 150, flash solid-state storage device 152, flash solid-state storage device 154, and flash solid-state storage device 156. Accordingly, coded target 158 may be configured as a "parity" drive for storing "parity" data (i.e., a type of coded data) that may provide a level of high availability for flash solid-state storage devices 150, 152, 154, 156.

While non-volatile, solid-state, cache memory system 128 is shown to include a single coded target (e.g. coded target 158), this is for illustrative purposes only and is not intended to be a limitation of this disclosure. For example, the number of coded targets may be increased to provide an enhanced level of high availability. For example, a plurality of coded targets may be utilized with one or more highly-tolerant, error correction algorithms, such as the Reed-Solomon error correction algorithm and the Low-Density, Parity-Check code (i.e. LDPC code) error correction algorithm.

When storing the unique data elements (e.g., data element "a", data element "b", data element "c", or data element "d") and storing the coded data (e.g., coded element "p") of data segment 138 on each of flash solid-state storage devices 150, 152, 154, 156, 158 (respectively), the unique data elements and the unique coded element may be stored in a manner that facilitates easy retrieval (e.g., during read requests for data extents within data segment 138). For example, each data element and coded element may be stored at the same memory address on each of flash solid-state storage devices 150, 152, 154, 156, 158. Specifically, when the four two-kilobyte data elements (e.g., data element "a", data element "b", data element "c", and data element "d") of eight-kilobyte data segment 138 are stored on flash solid-state storage devices 150, 152, 154, 156 and the two-kilobyte coded element (e.g., coded element "p") of eight-kilobyte data segment 138 is generated and stored on flash solid-state storage device 158, each two-kilobyte data element and coded element may be stored at the same memory address within each of flash solid-state storage devices 150, 152, 154, 156, 158.

As discussed above, when storing the coded data (e.g. coded element "p"), the coded data may be stored on coded target 158 only a single time for each time a complete data segment (e.g., data segment 138) is stored on flash solid-state storage devices 150, 152, 154, 156 respectively. Accordingly, upon data segment 138 being received by non-volatile, solid-state, cache memory system 128, data storage process 10 may store data element "a" on flash solid-state storage device 150; may store data element "b" on flash solid-state storage device 152; may store data element "c" on flash solid-state storage device 154; and may store data element "d" on flash solid-state storage device 156. Only once the storage of the four data elements (namely data element "a", data element "b", data element "c", and data element "d") has been completed will coded element "p" be stored on flash solid-state storage device 158 (i.e., the coded target). Additionally/alternatively, coded element "p" may be stored at the same time that data element "a", data element "b", data element "c" and data element "d" are stored. As discussed above, by only writing coded element "p" to flash solid-state storage device 158 once (i.e., as opposed to, in this example, four times), the number of write operations executed upon flash solid-state storage device 158 is reduced by the following ratio:

$$\text{ratio} = \left(\frac{\#fssd(data) - 1}{\#fssd(data)}\right) = \frac{4-1}{4} = 75\%$$

Upon receiving, on storage initiator device 100, a data read request (e.g., data read request 120) for a data extent that had been previously-stored within storage network 12, data storage process 10 may examine volatile, solid-state, cache memory system 126 to determine if the previously-stored data extent is stored within volatile, solid-state, cache memory system 126.

If the previously-stored data extent is stored within volatile, solid-state, cache memory system 126, data storage process 10 may provide the previously-stored data extent from volatile, solid-state, cache memory system 126 to storage initiator device 100.

If the previously-stored data extent is not stored within volatile, solid-state, cache memory system 126, data storage process 10 may examine non-volatile, solid-state, cache memory system 128 to determine if the previously-stored data extent is stored within non-volatile, solid-state, cache memory system 128.

If the previously-stored data extent is stored within non-volatile, solid-state, cache memory system 128, data storage process 10 may provide the previously-stored data extent from non-volatile, solid-state, cache memory system 128 to volatile, solid-state, cache memory system 126.

If the previously-stored data extent is not stored within non-volatile, solid-state, cache memory system 128, data storage process 10 may provide the previously-stored data extent from non-volatile, electromechanical memory system 112 to volatile, solid-state, cache memory system 126. By providing the previously-stored data extent directly from non-volatile, electromechanical memory system 112 to volatile, solid-state, cache memory system 126 (thus bypassing non-volatile, solid-state, cache memory system 128), the number of times that data is written to non-volatile, solid-state, cache memory system 128 may be reduced.

Single Instance Storage System:

One or more portions of storage network 12 may be configured as a single instance storage system. For example, non-volatile, solid-state, cache memory system 128 may be configured as a single instance storage system. As is known in the art, a single instance storage system is a data storage system that is configured to eliminate the storage of redundant copies of data. For example, e-mail servers may utilize a single instance storage system to prevent the redundant storage of identical attachments that are received from a plurality of senders.

In order to prevent the redundant storage of such an attachment, a single instance storage system may analyze a newly-received attachment and compare characteristics of the newly-received attachment to characteristics of attachments that were previously-stored on the single instance storage system. In the event that an identical copy of the newly-received attachment was previously stored on and is currently residing within the single instance storage system, the newly-received attachment will not be stored on the single instance storage system, thus increasing storage efficiency. Another example is when an existing file is copied (e.g., by a user) and a few bytes of new information are inserted into the file. A single instance storage system may only save the newly-added data and would not store a redundant copy of the identical portions of the copied file.

For illustrative purposes only, assume that non-volatile, solid-state, cache memory system 128 is configured as a single instance storage system. As discussed above, processing logic 124 may initially store e.g., data extent 118 within volatile, solid-state, cache memory system 126, and may subsequently destage data extent 118 to non-volatile, solid-state, cache memory system 128. The destaging of data extent 118 to non-volatile, solid-state, cache memory system 128 may be accomplished by gathering a plurality of data extents (e.g., data extent 118) within volatile, solid-state, cache memory system 126, apportioning the data extents into a plurality of data elements (e.g., data elements 130, 132, 134, 136), and destaging this plurality of data elements (e.g., data elements 130, 132, 134, 136) as a single data segment (e.g., data segment 138) to non-volatile, solid-state, cache memory system 128.

Accordingly, upon receiving 200 (e.g., from volatile, solid-state, cache memory system 126) a newly-received data portion (e.g. data extent 118) for storage within non-volatile, solid-state, cache memory system 128, data storage process 10 may determine 202 if the newly-received data portion (e.g. data extent 118) corresponds with at least one data portion previously written to and currently resident on non-volatile, solid-state, cache memory system 128. In this particular example, data portions that were previously-written to non-volatile, solid-state, cache memory system 128 may include, but are not limited to, data portions that were previously destaged from volatile, solid-state, cache memory system 126 to non-volatile, solid-state, cache memory system 128.

For illustrative purposes only, the newly-received and previously-written data portions are described in this example as being data extents. However, this is not intended to be a limitation of this disclosure, as the data portions may be increased/decreased in size based upon one or more design criteria. For example, the newly-received and previously-written data portions may be data segments (e.g., data segment 138) or data elements (e.g., one or more of data elements 130, 132, 134, 136).

If data storage process 10 determines 202 that the newly-received data portion (e.g. data extent 118) does not correspond with at least one data portion that was previously-written to and currently resident on non-volatile, solid-state, cache memory system 128, data storage process 10 may store 204 the newly-received data portion (e.g. data extent 118) on non-volatile, solid-state, cache memory system 128.

When determining 202 if the newly-received data portion (e.g. data extent 118) corresponds with at least one data portion previously written to and currently resident on non-volatile, solid-state, cache memory system 128, data storage process 10 may compare the newly-received data portion (e.g. data extent 118) to each of the data portions previously-written to and currently resident on non-volatile, solid-state, cache memory system 128.

For example and in one illustrative embodiment, determining 202 if the newly-received data portion (e.g. data extent 118) corresponds with at least one data portion previously written to and currently resident on non-volatile, solid-state, cache memory system 128 may include generating 206 a mathematical hash (not shown) of the newly-received data portion (e.g. data extent 118) and each of the previously-written data portions. Data storage process 10 may then compare 208 the mathematical hash of the newly-received data portion (e.g. data extent 118) with the mathematical hash of each of the previously-written and currently resident data portions. The various mathematical hashes generated 206 may be stored within non-volatile, solid-state, cache memory system 128.

As is known in the art, when the newly-received data portion (e.g. data extent 118) is processed by data storage process 10 to generate 206 the mathematical hash, the mathematical hash generated 206 is essentially a digital "fingerprint" of the newly-received data portion (e.g. data extent 118) that may serve to definitively identify the newly-received data portion (e.g. data extent 118). Since only an identical data extent would have an identical mathematical hash, the mathematical hash generated 206 for the newly-received data portion (e.g. data extent 118) may be compared 208 to the mathematical hash generated for each data segment previously-stored on and still residing on non-volatile, solid-state, cache memory system 128.

In the event that matching hashes are found, a copy of the newly-received data portion (e.g. data extent 118) has been previously-stored on and still resides on non-volatile, solid-state, cache memory system 128. Accordingly, if data storage process 10 determines 202 that the newly-received data portion (e.g. data extent 118) corresponds with at least one data portion that was previously-written to and still resides on non-volatile, solid-state, cache memory system 128 (e.g., if data storage process 10 determines that the hash generated 206 for the newly-received data portion matches any of the hashes generated for the previously-stored data portions), data storage process 10 may discard 210 the newly-received data portion (e.g. data extent 118). Accordingly, the newly-received data portion (e.g. data extent 118) will not be stored again on non-volatile, solid-state, cache memory system 128. until the matching data portion is deleted from the non-volatile, solid-state, cache memory system [128]

Conversely, in the event that matching hashes are not found (i.e., if data storage process 10 determines 202 that the newly-received data portion does not correspond with at least one previously-written and currently resident data portion), the newly-received data portion (e.g. data extent 118) is not currently present on non-volatile, solid-state, cache memory system 128. Accordingly, data storage process 10 may store 204 the newly-received data portion (e.g. data extent 118) on non-volatile, solid-state, cache memory system 128.

Data storage process 10 may maintain 212 a functionality 140 (FIG. 2) that locates each of the previously-written and currently resident, data-portions within non-volatile, solid-state, cache memory system 128. An example of functionality 140 may include, but is not limited to, a lookup table that may be stored within non-volatile, solid-state, cache memory system 128. Functionality 140 may uniquely identify and locate each data portion stored within non-volatile, solid-state, cache memory system 128. Additionally, functionality 140 may identify the hash that was generated 206 for each data portion stored and locate each data portion stored within non-volatile, solid-state, cache memory system 128. As discussed above, when a data portion (e.g., a data extent) is received 200 and stored 204 on non-volatile, solid-state, cache memory system 128, a hash function may be generated 206 for the received data portion and the hash generated 206 may be defined within functionality 140. Accordingly, when data storage process 10 compares 208 the mathematical hash of a newly-received data portion (e.g. data extent 118) with the mathematical hash of each of the data portions previously written to and currently residing on non-volatile, solid-state, cache memory system 128, data storage process 10 may compare 208 the mathematical hash of the newly-received data portion (e.g. data extent 118) with the mathematical hashes defined within functionality 140. As additional data portions are stored 204 within non-volatile, solid-state, cache memory system 128, functionality 140 may be updated 214 to e.g., identify, locate (within non-volatile, solid-state, cache memory system 128), and define the hash generated 206 for the newly-stored data portion.

Further and as discussed above, being that data storage process 10 is configured to store only a single instance of a data portion, a single copy of a data portion (stored within non-volatile, solid-state, cache memory system 128) may be associated with a plurality of received data portions. For example, assume that five identical copies of a particular data portion (e.g., data extent "x") are received 200 for storage within non-volatile, solid-state, cache memory system 128.

Being that data storage process 10 will store 204 only one copy of data extent "x" and will discard 210 four copies of data extent "x", functionality 140 may be configured to associate each of the five received data portions with the same single copy of data extent "x" stored within non-volatile, solid-state, cache memory system 128. Therefore, assume for illustrative purposes that the five identical data portions received are data extent "$x_1$", data "$x_2$", data "$x_3$", data "$x_4$", and data extent "$x_5$". Further, assume that data extent "$x_1$" (i.e., the first data portion received) is stored 204 (at address "ABC") on non-volatile, solid-state, cache memory system 128 and the remaining data portions (namely data extent "$x_2$", data extent "$x_3$", data extent "$x_4$", and data extent "$x_5$") subsequently received are discarded 210. Accordingly, functionality 140 may include five (5) discrete entries (e.g., one for each of data extent "$x_1$", data extent "$x_2$", data extent "$x_3$", data extent "$x_4$", and data extent "$x_5$"), all of which point to the same single copy of the data portion (namely data extent "$x_1$") stored 204 at address (i.e., "ABC") on non-volatile, solid-state, cache memory system 128.

Each of these five discrete entries may define the same location (i.e., address "ABC") within non-volatile, solid-state, cache memory system 128, as each entry points to the same data portion (i.e., data extent "$x_1$") stored within non-volatile, solid-state, cache memory system 128. Additionally, as all five entries within functionality 140 locate the same data portion (i.e., data extent "$x_1$"), the hashes for each of the five entries defined within functionality 140 may be identical (e.g., having a value of "XYZ"). However, each of the five entries within functionality 140 may uniquely identify the data portion located as data extent "$x_1$", data extent "$x_2$", data extent "$x_3$", data extent "$x_4$", and data extent "$x_5$". Assume for illustrative purposes that a sixth identical data portion (data extent "$x_6$"; not shown) is received 200 for storage within non-volatile, solid-state, cache memory system 128. Upon data storage process 10 generating 206 the hash (i.e., "XYZ") for the sixth identical data portion (data extent "$x_6$"; not shown) and comparing 208 the hash generated 206 for the sixth identical data portion (data extent "$x_6$"; not shown) with the mathematical hashes defined within functionality 140, data storage process 10 may discard 210 the sixth identical data portion (data extent "$x_6$"; not shown). Data storage process 10 may update 214 functionality 140 to associate the sixth identical data portion (data extent "$x_6$"; not shown) with the corresponding previously-written data portion (namely data extent "$x_1$") defined within functionality 140. Accordingly, data storage process 140 may update functionality 140 to include a sixth entry (not shown) that defines data extent "$x_6$" as being stored at address "ABC" and having a hash of "XYZ".

Further, if an address (e.g., address "ABC") in non-volatile, solid-state, cache memory system 128 is subsequently re-written with new/different data and, therefore, no longer has hash value "XYZ"), data storage process 10 may delete/modify the appropriate data entry within functionality 140.

Continuing with the above stated example, assume that each of data extent "$x_1$", data "$x_2$", data "$x_3$", data "$x_4$", data "$x_5$" and data extent "$x_6$") were destaged to non-volatile, electromechanical memory system 112 and, therefore, are no longer needed within non-volatile, solid-state, cache memory system 128. Further, assume that a new data portion (e.g., data extent "$x_7$") is stored 204 within non-volatile, solid-state, cache memory system 128.

Being that none of data extent "$x_1$", data extent "$x_2$", data extent "$x_3$", data extent "$x_4$", data extent "$x_5$" and data extent "$x_6$" are needed anymore, data storage process 10 may overwrite address "ABC" within non-volatile, solid-state, cache memory system 128 (i.e., the address that stores the single copy of data extent "$x_1$") with the new data portion (e.g., data extent "$x_7$"). Data storage process 10 may update 214 functionality 140 to add a new data entry that defines the location (e.g., address "ABC") and hash value ("YZA") of the new data portion (e.g., data extent "$x_7$") and may delete the data entries concerning data extent "$x_1$", data extent "$x_2$", data extent "$x_3$", data extent "$x_4$", data extent "$x_5$" and data extent "$x_6$" from functionality 140.

Further, data storage process 10 may overwrite a previously-written data portion in the event that a modified version of the previously-written data portion is subsequently received for storage on storage network 12. Continuing with the above stated example, assume that a new version of data extent "$x_1$" is received for storage on storage network 12. Being that the hash of the new version of data extent "$x_1$" will be different than the hash of the older version of data extent "$x_1$", data storage process 10 may store the new version of data extent "$x_1$" at a new memory address (e.g., address "LMN") within non-volatile, solid-state, cache memory system 128. Additionally, data storage process 10 may update 214 functionality 140 to add a new data entry that defines the location (e.g., address "LMN") and hash value ("ZAB") of the new version of data extent "$x_1$". Further, when updating 214 functionality 140, data storage process 10 may delete the data entry that corresponds to the older version of data extent "$x_1$" (which defines the address as "ABC" and the hash value as "XYZ").

In the event that a particular data portion (e.g., data extent "$x_2$") needs to be read from non-volatile, solid-state, cache memory system 128, data storage process 10 may utilize functionality 140 to locate the particular data portion (e.g., data extent "$x_2$") within non-volatile, solid-state, cache memory system 128.

While data storage process 10 is described above as utilizing a mathematical hash function to generate a mathematical hash of the data portions previously stored on non-volatile, solid-state, cache memory system 128, this is for illustrative purposes only and is not intended to be a limitation of this disclosure, as other configurations are possible. For example, various other mathematical functions may be used to process the data portions and definitively determine whether or not the processed data portions are currently stored within non-volatile, solid-state, cache memory system 128.

While the system is described above as only saving a single copy of a data portion (e.g., data extent 118) within non-volatile, solid-state, cache memory system 128, this is for illustrative purposes only and is not intended to be a limitation of this disclosure. For example, data storage process 10 may be configured to save multiple copies of e.g. data extent 118 within non-volatile, solid-state, cache memory system 128, thus providing a level of high availability with respect to data extent 118.

While data storage process 10 is described above as being utilized within a single instance storage system, this is for illustrative purposes only and is not intended to be a limitation of this disclosure, as other configurations are possible. For example, data storage process 10 may be utilized in a distributed file system, distributed database, distributed block storage, distributed local area web cache, distributed compute cluster, distributed object storage, and distributed name service.

While data storage process 10 is described above as being utilized within non-volatile, solid-state, cache memory system 128, this is for illustrative purposes only and is not intended to be a limitation of this disclosure, as other configurations are possible. For example, data storage process 10 may be utilized within volatile, solid-state, cache memory system 126.

While data storage process 10 is described above as having a "dedicated" coded target (e.g. flash solid-state storage device 158), this is for illustrative purposes only and is not intended to be a limitation of this disclosure. Specifically, the coded target included within non-volatile, solid-state, cache memory system 128 may be a "distributed" coded target (as in a RAID 5 array), in that the coded element for a first data segment may be stored on a first physical device, the coded element for a second data segment may be stored on a second physical device, and the coded element for a third data segment may be stored on a third physical device.

For example, for data segment 138, flash solid-state storage device 158 is described as storing coded element "p" and flash solid-state storage devices 150, 152, 154, 156 are described as storing data element "a", data element "b", data element "c", and data element "d" (respectively). However, for a subsequent data segment (data segment "x"; not shown), flash solid-state storage device 150 may be configured to store coded element "p" (for data segment "x") and flash solid-state storage devices 152, 154, 156, 158 may be configured to store data element "a", data element "b", data element "c", and data element "d" (for data segment "x"). Accordingly, data storage process 10 may vary the specific target assigned the task of storing the coded element depending upon the specific data segment being stored within non-volatile, solid-state, cache memory system 128. Therefore, by configuring non-volatile, solid-state, cache memory system 128 as a RAID 5 array, the above-described "write" reductions may be equally distributed across all of the flash solid-state storage devices included within non-volatile, solid-state, cache memory system 128 (as opposed to just flash solid-state storage device 158).

While various portions of the above-described system are described as being RAID 0, RAID 1, RAID 4 and RAID 5, this is for illustrative purposes only and is not intended to be a limitation of this disclosure. Specifically, the various portions of the above-described system may be configured using one or more standard RAID levels or one or more custom RAID levels.

For example, non-volatile, solid-state, cache memory system 128 may be configured using a variety of RAID levels. As discussed below, non-volatile, solid-state, cache memory system 128 may be configured dynamically (i.e., the data may be written to non-volatile, solid-state, cache memory system 128 using the RAID level that best suits the particular type of data being written).

SYSTEM METADATA may be small IOs (e.g., data extent 118) that need redundancy, but are not easily gathered into a data segment due to their small size and their function as data descriptors (e.g., system metadata often describes remapped data). Accordingly, data storage process 10 may write system metadata extents to non-volatile, solid-state, cache memory system 128 using a RAID 1 format.

CLEAN USER DATA: Clean user data is data that is already stored within e.g., non-volatile, electromechanical memory system 112. Accordingly, clean user data extents may be gathered into data segments that do not require redundancy in the cache. Therefore, data storage process 10 may write clean user data extents to non-volatile, solid-state, cache memory system 128 as a data segment using a RAID 0 format.

DIRTY USER DATA: Dirty user data is data that is not already stored within e.g., non-volatile, electromechanical memory system 112. Accordingly, dirty user data extents may be gathered into data segments that (unlike clean user data extents) do require redundancy. Therefore, data storage process 10 may write dirty user data extents to non-volatile, solid-state, cache memory system 128 as a data segment using a log-style, full-stripe RAID 5 write operation (as discussed above and as disclosed in U.S. Pat. No. 6,865,650 to Morley et al and assigned to EMC Corporation of Hopkinton, Mass.).

A number of implementations have been described. Nevertheless, it will be understood that various modifications may be made. Accordingly, other implementations are within the scope of the following claims.

What is claimed is:

1. A method comprising:
  receiving, from a volatile solid-state cache memory system, a newly-received data portion for storing within a non-volatile solid-state cache memory system;
  determining if the newly-received data portion corresponds with at least one data portion previously written to and currently resident on the cache memory system; and
  if the newly-received data portion does not correspond with at least one previously-written and currently resident data portion, gathering a plurality of data extents within the volatile solid-state cache memory system, apportioning the data extents into a plurality of data elements, and destaging the plurality of data elements as a single data segment to the non-volatile solid-state cache memory system and storing the newly-received data portion on the non-volatile cache memory system.

2. The method of claim 1 further comprising:
maintaining a functionality that locates each of the previously-written and currently resident data-portions within the cache memory system.

3. The method of claim 2 wherein the functionality is a lookup table.

4. The method of claim 2 further comprising:
updating the functionality to locate the newly-received, data-portion within the cache memory system.

5. The method of claim 1 further comprising:
if the newly-received data portion corresponds with at least one previously-written and currently resident data portion, discarding the newly-received data portion.

6. The method of claim 5 further comprising:
maintaining a functionality that locates each of the previously-written and currently resident data-portions within the cache memory system.

7. The method of claim 6 wherein the functionality is a lookup table.

8. The method of claim 6 further comprising:
updating the functionality to associate the newly-received, data-portion with the corresponding at least one previously-written and currently resident data portion.

9. The method of claim 1 wherein the data portion is chosen from the group consisting of: a data extent, a data segment, and a data element.

10. The method of claim 1 wherein determining if the newly-received data portion corresponds with at least one data portion previously written to and currently resident on the cache memory system includes:
generating a mathematical hash of the newly-received data portion and each of the previously-written data portions; and
comparing the mathematical hash of the newly-received data portion with the mathematical hash of each of the previously-written and currently resident data portions.

11. A computer program product residing on a computer readable medium having a plurality of instructions stored thereon which, when executed by a processor, cause the processor to perform operations comprising:
receiving, from a volatile solid-state cache memory system, a newly-received data portion for storing within a non-volatile solid-state cache memory system;
determining if the newly-received data portion corresponds with at least one data portion previously written to and currently resident on the cache memory system; and if the newly-received data portion does not correspond with at least one previously-written and currently resident data portion, gathering a plurality of data extents within the volatile solid-state cache memory system, apportioning the data extents into a plurality of data elements, and destaging the plurality of data elements as a single data segment to the non-volatile solid-state cache memory system and storing the newly-received data portion on the non-volatile cache memory system.

12. The computer program product of claim 11 further comprising instructions for:
maintaining a functionality that locates each of the previously-written and currently resident data-portions within the cache memory system.

13. The computer program product of claim 12 wherein the functionality is a lookup table.

14. The computer program product of claim 12 further comprising instructions for:
updating the functionality to locate the newly-received, data-portion within the cache memory system.

15. The computer program product of claim 11 further comprising instructions for:
if the newly-received data portion corresponds with at least one previously-written and currently resident data portion, discarding the newly-received data portion.

16. The computer program product of claim 15 further comprising instructions for:
maintaining a functionality that locates each of the previously-written and currently resident data-portions within the cache memory system.

17. The computer program product of claim 16 wherein the functionality is a lookup table.

18. The computer program product of claim 16 further comprising instructions for:
updating the functionality to associate the newly-received, data-portion with the corresponding at least one previously-written and currently resident data portion.

19. The computer program product of claim 11 wherein the data portion is chosen from the group consisting of: a data extent, a data segment, and a data element.

20. The computer program product of claim 11 wherein the instructions for determining if the newly-received data portion corresponds with at least one data portion previously written to and currently resident on the cache memory system include instructions for:
generating a mathematical hash of the newly-received data portion and each of the previously-written and currently resident data portions; and
comparing the mathematical hash of the newly-received data portion with the mathematical hash of each of the previously-written and currently resident data portions.

* * * * *